United States Patent
Faue et al.

(10) Patent No.: US 7,440,351 B2
(45) Date of Patent: Oct. 21, 2008

(54) WIDE WINDOW CLOCK SCHEME FOR LOADING OUTPUT FIFO REGISTERS

(75) Inventors: Jon Allan Faue, Colorado Springs, CO (US); Van Butler, Colorado Springs, CO (US)

(73) Assignee: ProMOS Technologies PTE. Ltd., Singapore (SG)

( * ) Notice: Subject to any disclaimer, the term of this patent is extended or adjusted under 35 U.S.C. 154(b) by 49 days.

(21) Appl. No.: 11/257,610

(22) Filed: Oct. 25, 2005

(65) Prior Publication Data

US 2007/0091691 A1   Apr. 26, 2007

(51) Int. Cl.
*G11C 7/00* (2006.01)

(52) U.S. Cl. .................. 365/221; 365/191; 365/194

(58) Field of Classification Search ................ 365/221
See application file for complete search history.

(56) References Cited

U.S. PATENT DOCUMENTS 6,678,201 B2 * 1/2004 Roohparvar et al. ........ 365/221
6,696,854 B2 * 2/2004 Momtaz et al. ............. 326/37

* cited by examiner

*Primary Examiner*—Huan Hoang
*Assistant Examiner*—Jason Lappas
(74) *Attorney, Agent, or Firm*—Peter J. Meza; William J. Kubida; Hogan & Hartson LLP

(57) ABSTRACT

A circuit provides the widest possible window for capturing data and preventing run-through in a FIFO register. The FIFO register includes two registers per I/O. Two FIFO input clocks are used, one for each FIFO register. When one FIFO clock is active, the other is automatically disabled. Initially, the circuit is reset such that one clock is active, and the other disabled. Upon receiving a valid READ command, a shift chain attached to the FICLK that is currently low begins counting the clock cycles. This eventually determines when the FICLK that is currently low can be enabled. The final enable is dependent upon the turning off the FICLK that is currently high. The FICLK that is enabled during the reset turns off a fixed delay after the falling edge of the YCLK associated with the READ command.

19 Claims, 19 Drawing Sheets

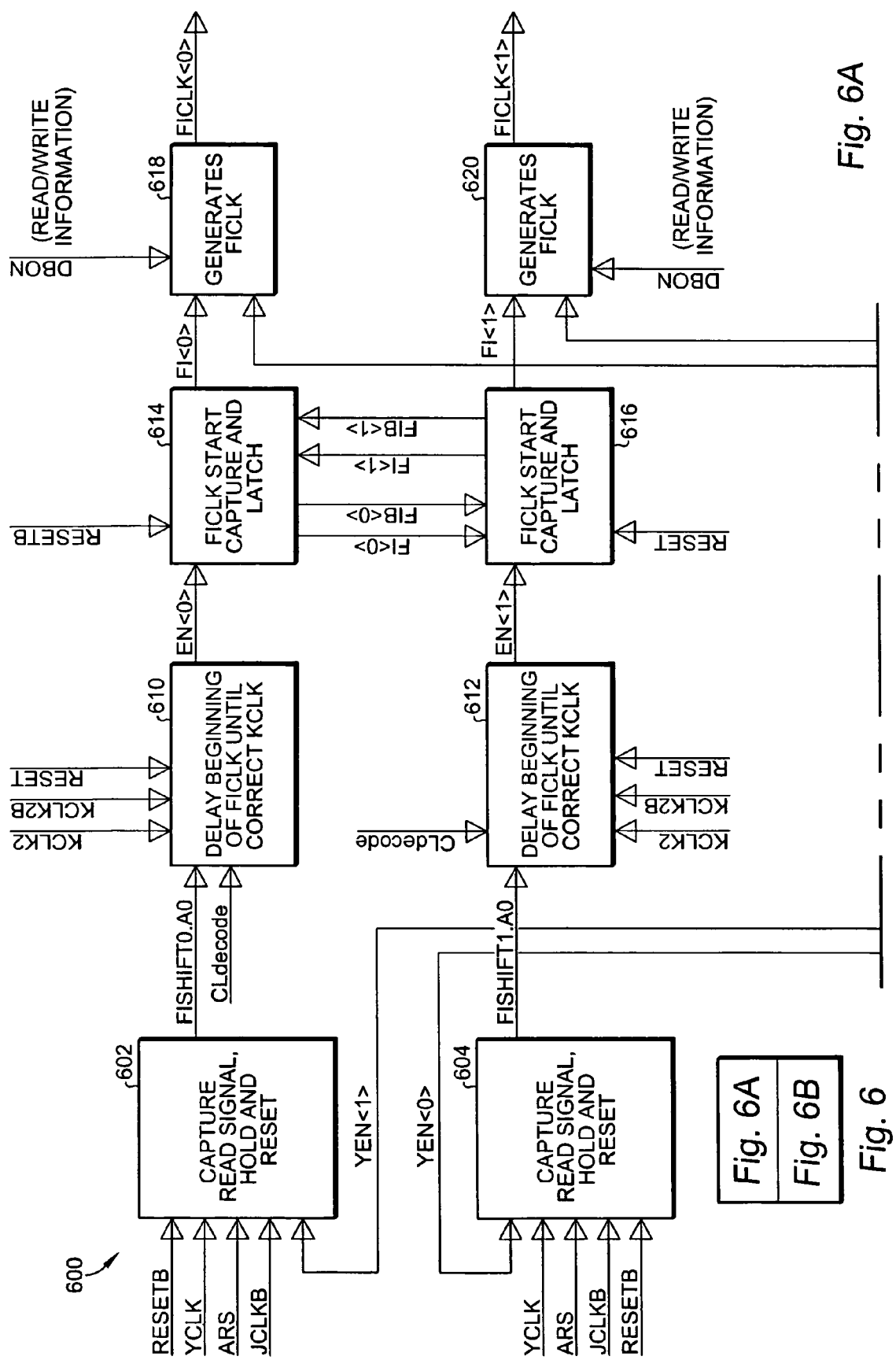

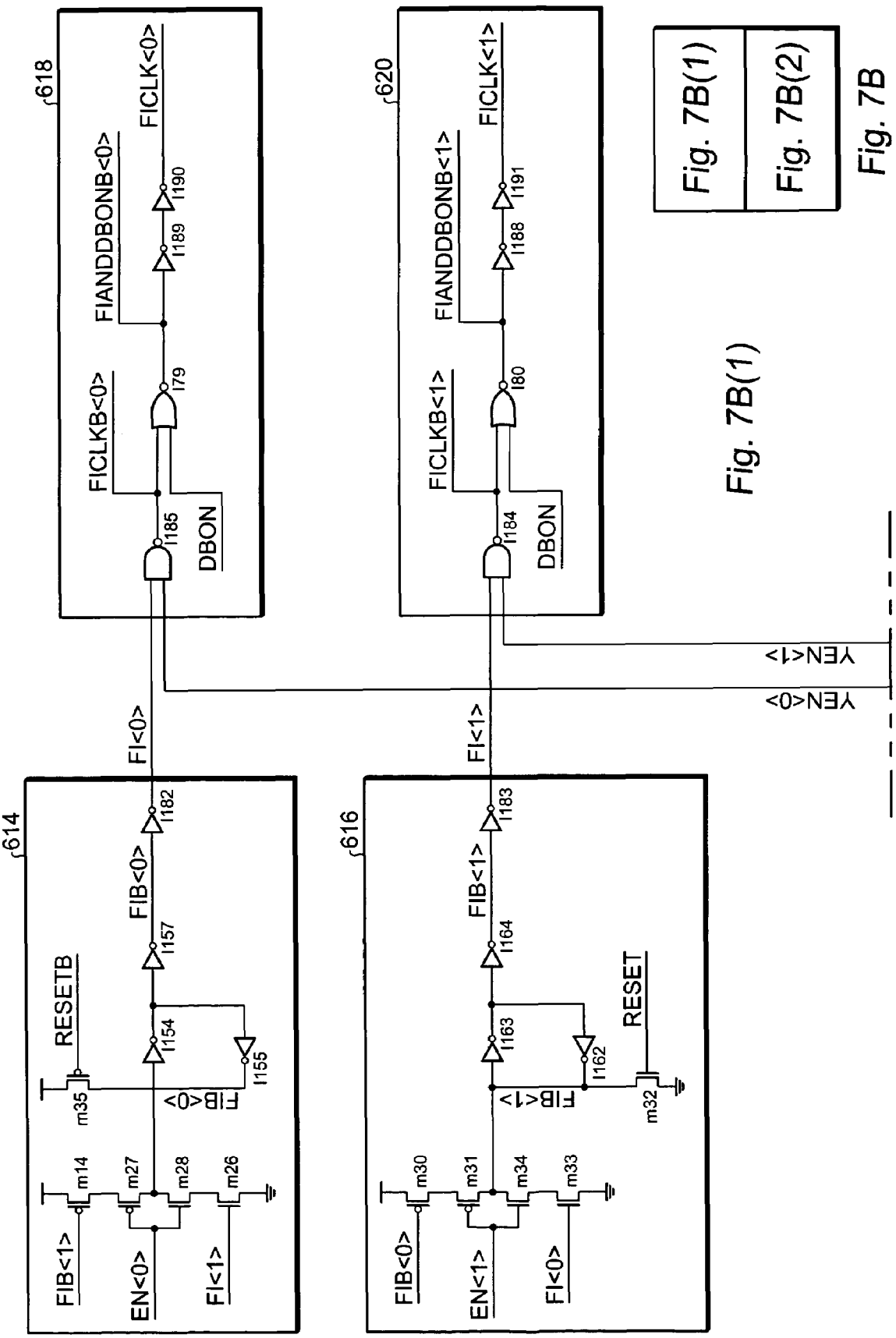

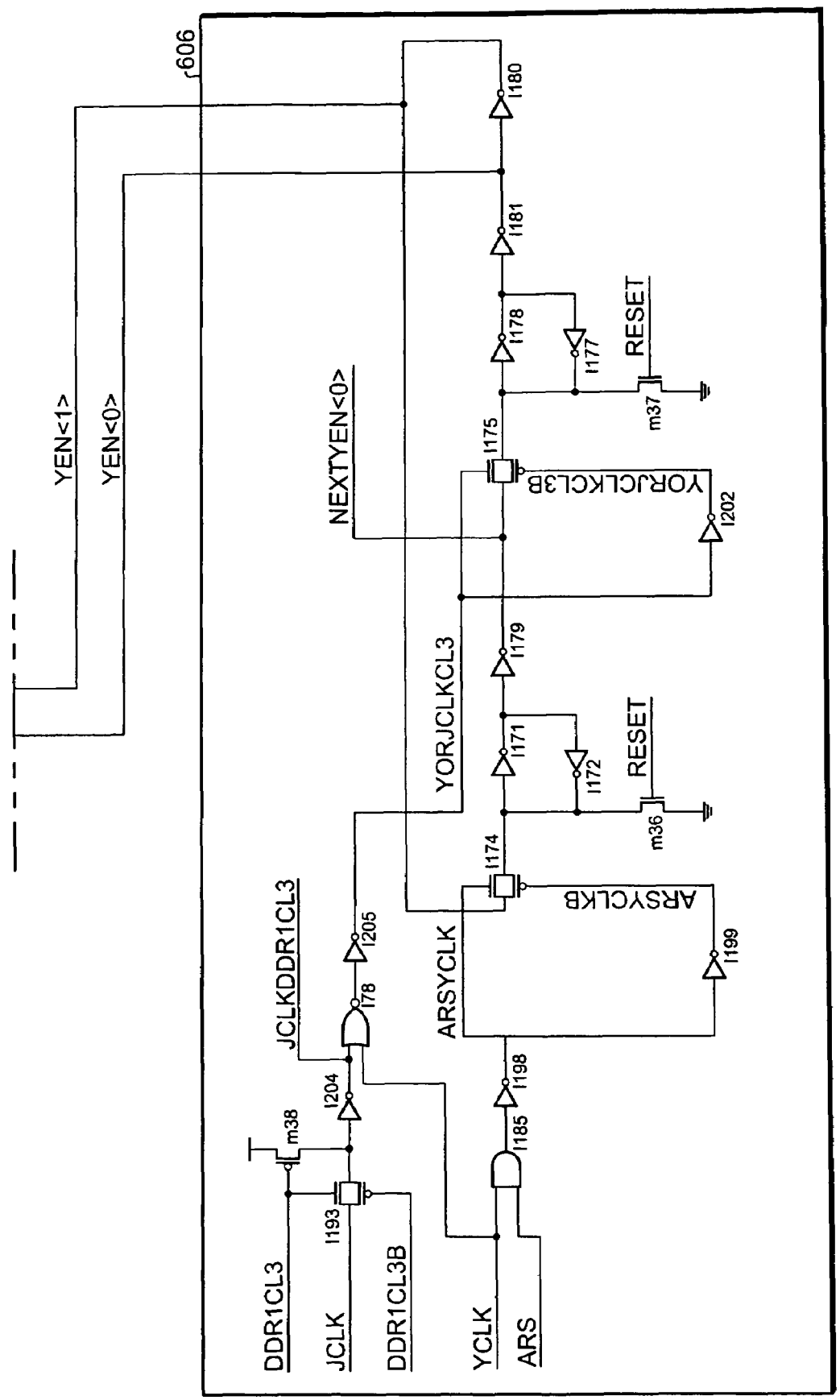
Fig. 7B(2)

Fig. 8B(1)

| Fig. 8B(1) |
| Fig. 6B(2) |

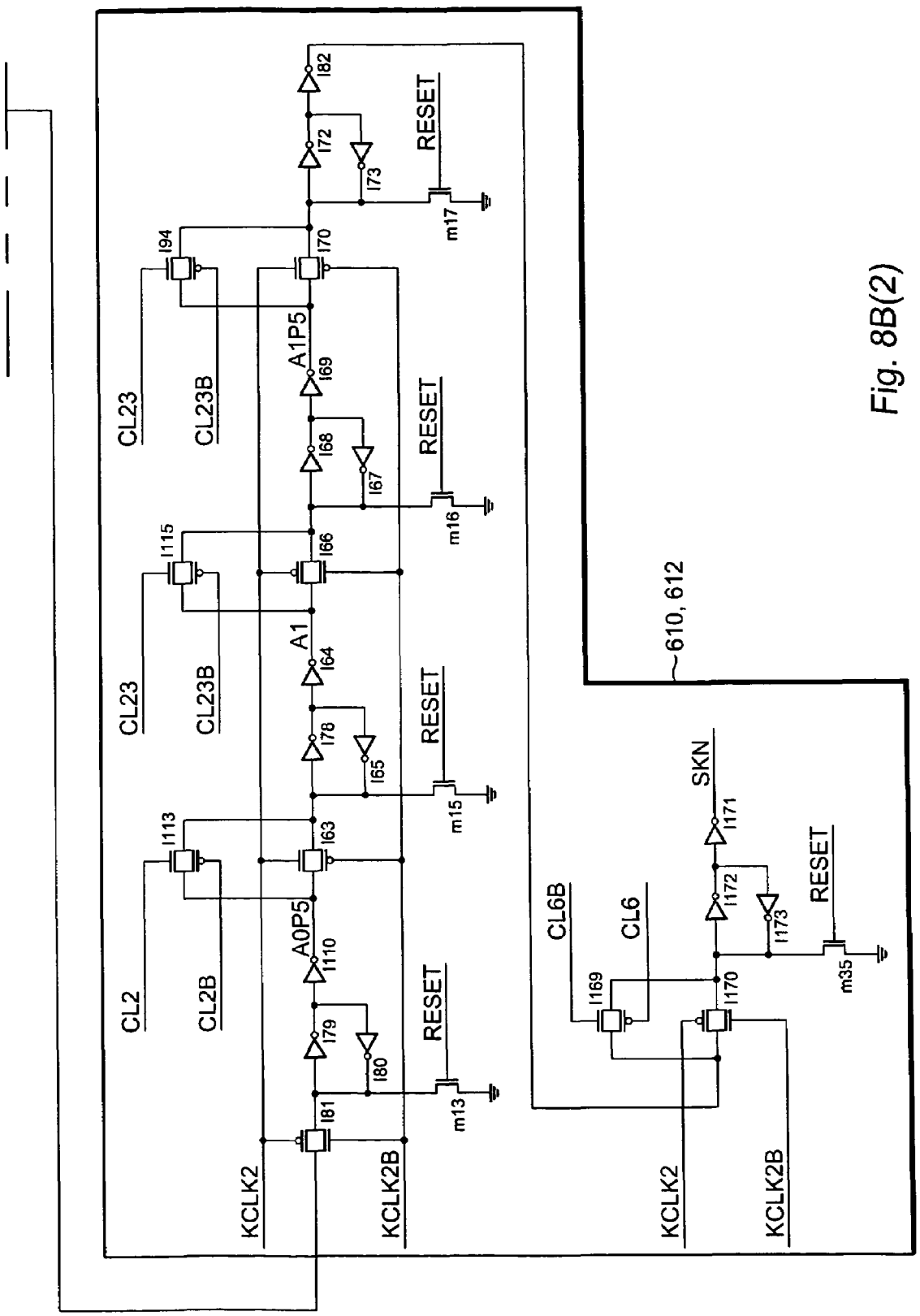
Fig. 8B(2)

WIDE WINDOW CLOCK SCHEME FOR LOADING OUTPUT FIFO REGISTERS

BACKGROUND OF THE INVENTION

The present invention relates to integrated circuits, and more particularly to a novel clocking scheme for FIFO ("first in-first out") registers resident on an integrated circuit memory or the like.

It should be noted that a glossary of timing signal definitions can be found below in the Detailed Description of the invention.

Typically, the FIFO loading clock (FICLK) is a derivative of the main chip clock (INT CLOCK), i.e. frequency(FICLK) =frequency(INT CLOCK). The actual phase and/or enable time may have been shifted to provide the widest possible window, but the frequency of the FIFO loading clock was limited to that of the main chip clock.

The two main deficiencies of linking the FIFO loading clock to the main chip clock are either that the FIFO input clock window is too narrow to provide for adequate data capture in all cases, or the window is too wide and "data run-through" is allowed to occur.

In typical designs, the phase of the FICLK is allowed to vary and can be equal to the phase of either the internal JCLK or YCLK, or another phase, but the phase is ultimately derived from the internal clock. The reason this was typically done is because the internal YCLK is a free-running clock and fires every cycle, regardless of whether a read or write operation is in progress.

An example of a prior art FICLK clock scheme is shown in FIG. 1. The internal JCLK and YCLK clock signals are shown, followed by a read signal. FICLK-Y shows a YCLK-based FIFO loading clock and FICLK-J shows a JCLK-based FIFO loading clock. Other clocks in the data path are needed so that data from "READ-B" is not loaded with the "FICLK-A" pulse.

However, according to the JEDEC DDR2 standard, YCLK cannot free run, since its frequency can be one-half of the external clock, and can be started on any random JCLK cycle.

Two distinct problems arise due to the DDR2 standard.

Firstly, if the FICLK runs off of a derivate of the internal clock (JCLK), controlling the placement of the clock to accommodate the datapath/CAS latency relationship is easy, but the FICLK can become too narrow to provide an adequate data capture window. In the example shown in FIG. 2, the FICLK can be placed in various places with respect to JCLK and YCLK, but its frequency must match that of the internal clock, and therefore its actual "on" time must be less than that of the internal clock. I-data is the data that must be captured by the FICLK. In the example of FIG. 2, "FICLK-A" misses "I-data-A". There is a delay 20 between the falling edge of the YCLK and the leading edge of the I-data due to simple R/C delays and device delays within the chip. This delay is significant because it changes with respect to temperature and supply voltages, while the period of the clock is fixed by the user. This means that the percentage of the clock period that delay 20 takes can change drastically depending on operating frequency, so a wide FICLK is required to guarantee correct data capture.

Secondly, if the FICLK runs off the YCLK, it may not align properly with what is required for the CL (CAS Latency). This is shown in the timing diagram of FIG. 3. It is possible that the output clock fires and attempts to fetch data from the FIFO register before the data is even loaded into the FIFO register by the FICLK. This is shown at time 30 in FIG. 3.

The two preceding examples of failure modes are examples only, and many such variations of possible failure modes are possible when combined with changes in frequency, data path speed, and CAS latency.

What is desired, therefore, is a clocking scheme for a FIFO that provides the widest possible window for capturing data while preventing data run-through.

SUMMARY OF THE INVENTION

According to an embodiment of the present invention, a circuit and method provides the widest possible window for capturing data and preventing run-through in a FIFO. The circuit of the present invention is designed to fail when the data-path of the chip is too slow to match the given clock rate. The overall performance is thus limited by the integrated circuit memory itself and not the FIFO loading scheme.

The FIFO register used in conjunction with FIFO clock circuit of the present invention includes two registers per I/O. Therefore two FIFO input clocks, designated FICLK<0:1>, are used. When one FICLK is enabled, the other is automatically disabled. Initially, the circuit is reset such that FICLK<1> is enabled, and FICLK<0> is disabled. This reset occurs when it is known the FICLK circuitry is not needed.

Upon receiving a valid READ command, a shift chain attached to the FICLK that is currently low begins counting the clock cycles. This eventually determines when the FICLK that is currently low can be enabled. The final enable is dependent upon the turning off of the FICLK that is currently high.

The FICLK that is enabled during the reset turns off a fixed delay after the falling edge of the YCLK associated with the READ command. The memory architecture outputs data from the array to the main memory bus on the falling edge of the YCLK. Therefore, sometime after YCLK falls new data will appear. The FICLK that is initially enabled during the reset can stay valid until that time. When the FICLK that was initially enabled during the reset is disabled by this delay, after the YCLK falling, then the FICLK that was disabled during the reset can be enabled. The FICLK that was disabled during the reset becomes enabled if the FICLK enabled by the reset is off, and the proper number of external cycles has expired to satisfy the given READ latency.

Therefore, the circuit of the present invention disables the currently active FICLK some delay after a known internal clock (YCLK) which indicates new data is coming that is dedicated to the next FICLK. The circuit of the present invention enables the next FICLK if the current FICLK is disabled and the proper number of external clock edges has expired to satisfy the specified read latency.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIGS. 7B and 7D are gate-level schematics of additional circuitry for providing the FIFO clocking scheme according to the present invention;

DETAILED DESCRIPTION OF AN EMBODIMENT OF THE INVENTION

According to the present invention, a FICLK is enabled, but not activated, based on information from the external clock. In this way, the FIFO is always loaded with the correct data, prior to its being output from the chip. The number of clock edges after the external read command is given before the FICLK is enabled is a function of the desired CL (CAS Latency). The FICLK is fully activated when the previous FICLK is disabled.

The previous FICLK is disabled only based upon information from the YCLK. Under the DDR2 standard, data only shows up in our datapath on the falling edge of a YCLK, so therefore that event is chosen as the defining point for the disable function. In this way, data "run through" does not occur in the FIFO register. (That is, data from "read B" does not end up in "FIFO-A".)

By enabling, but not activating, a central FICLK strictly based on information related to the external clock, activating the FICLK when the previous FICLK is disabled, and disabling the current FICLK based on the internal YCLK, (which runs at one-half the rate of the external clock and has essentially a completely variable duty cycle), the widest capture window for the FICLK is provided (which solves the first problem referred to above) and yet it is correctly positioned to support several different latencies and not have data run-through (which solves the second problem referred to above).

In the present invention, the FICLK does not change until the previous one has been disabled, i.e. the disable path has precedence, and this assures the widest possible capture window. Since YCLK is a variable width clock (limited to a maximum) the FICLK timing self-compensates to when the data is available.

Figure 1:
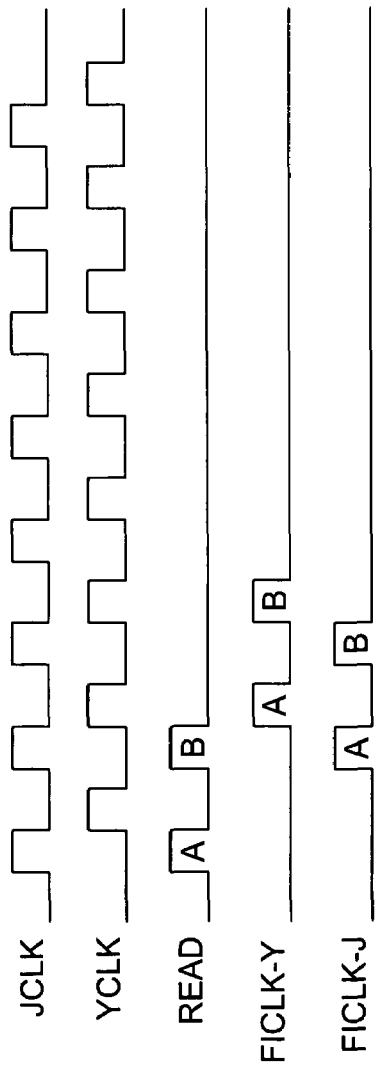
FIGS. 1-3 are timing diagrams associated with a prior art clocking scheme for a FIFO.
Figure 2:
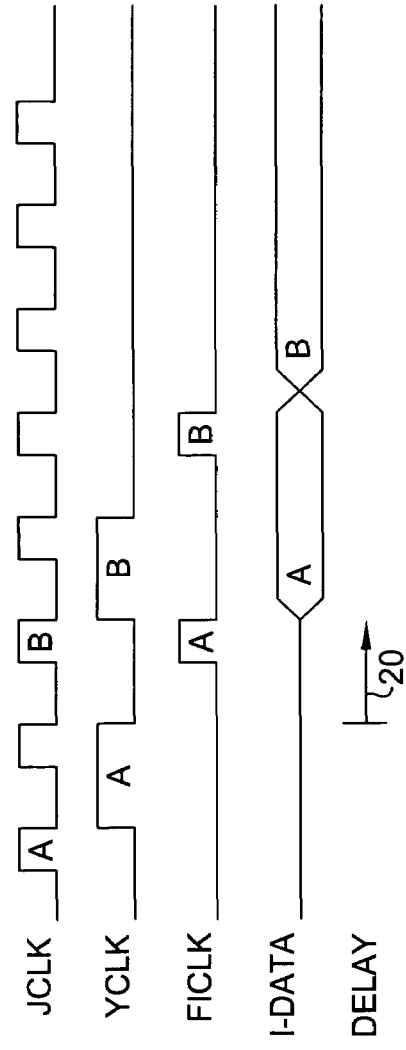
Figure 3:
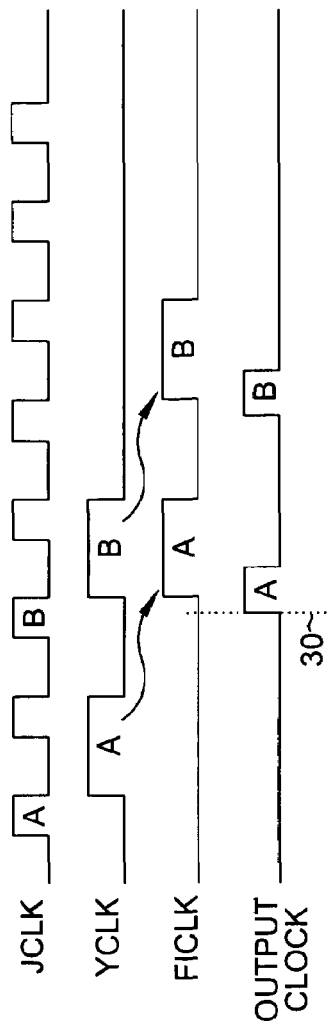
Figure 4:
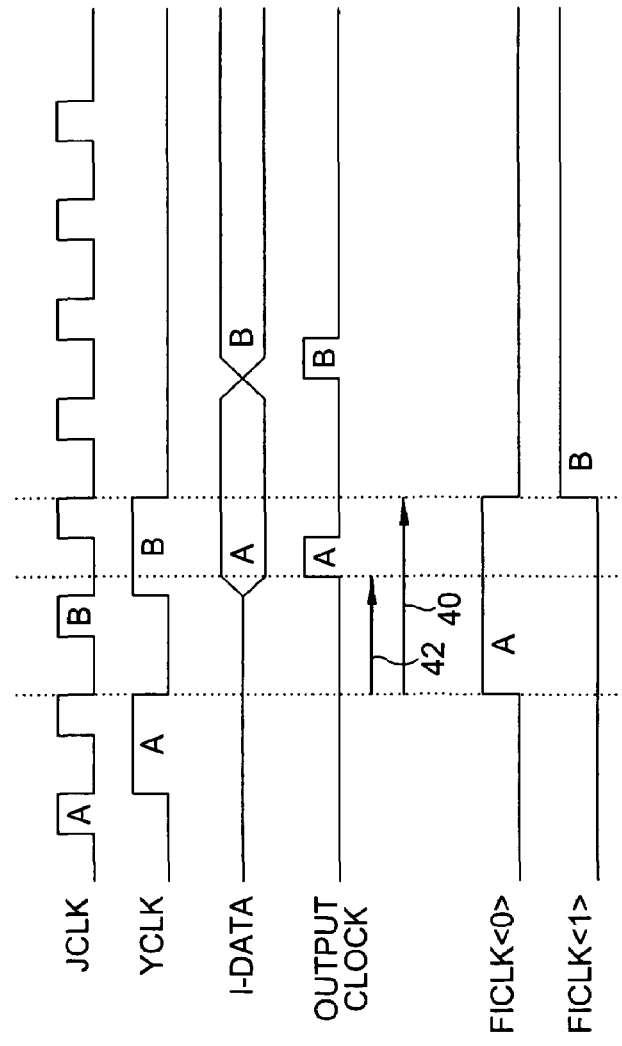
FIG. 4 is a timing diagram associated with a clocking scheme for a FIFO according to the present invention.

Referring now to FIG. 4, an example of the FICLK timing of the present invention is shown for a CL of three. Note that the FICLK<0> (the FICLK associated with the "A" data only) is on as long as possible (see time period 40) to capture the data. Note also that FICLK<0> is activated as soon as possible (see time period 42) to support a CL of three. Operating speed is limited by how fast I-data(A) can propagate to the intersection with FICLK<0> at the FIFO input. Note that FICLK<1> (the FICLK associated with the "B" data only) is activated only after FICLK<0> is disabled.

The total "on-time" of FICLK<0>+FICLK<1>=100%, i.e. the widest data capture window possible is provided for the FICLK function.

In sum, the method of the present invention operates as follows: activate a FICLK if the proper number of external edges have occurred following the issue of a read command, and the other FICLK(s) are not active; and disable a certain FICLK if the internal YCLK has fallen such that new data is on the way and data run-through will occur if the FICLK stays on.

Figure 5:
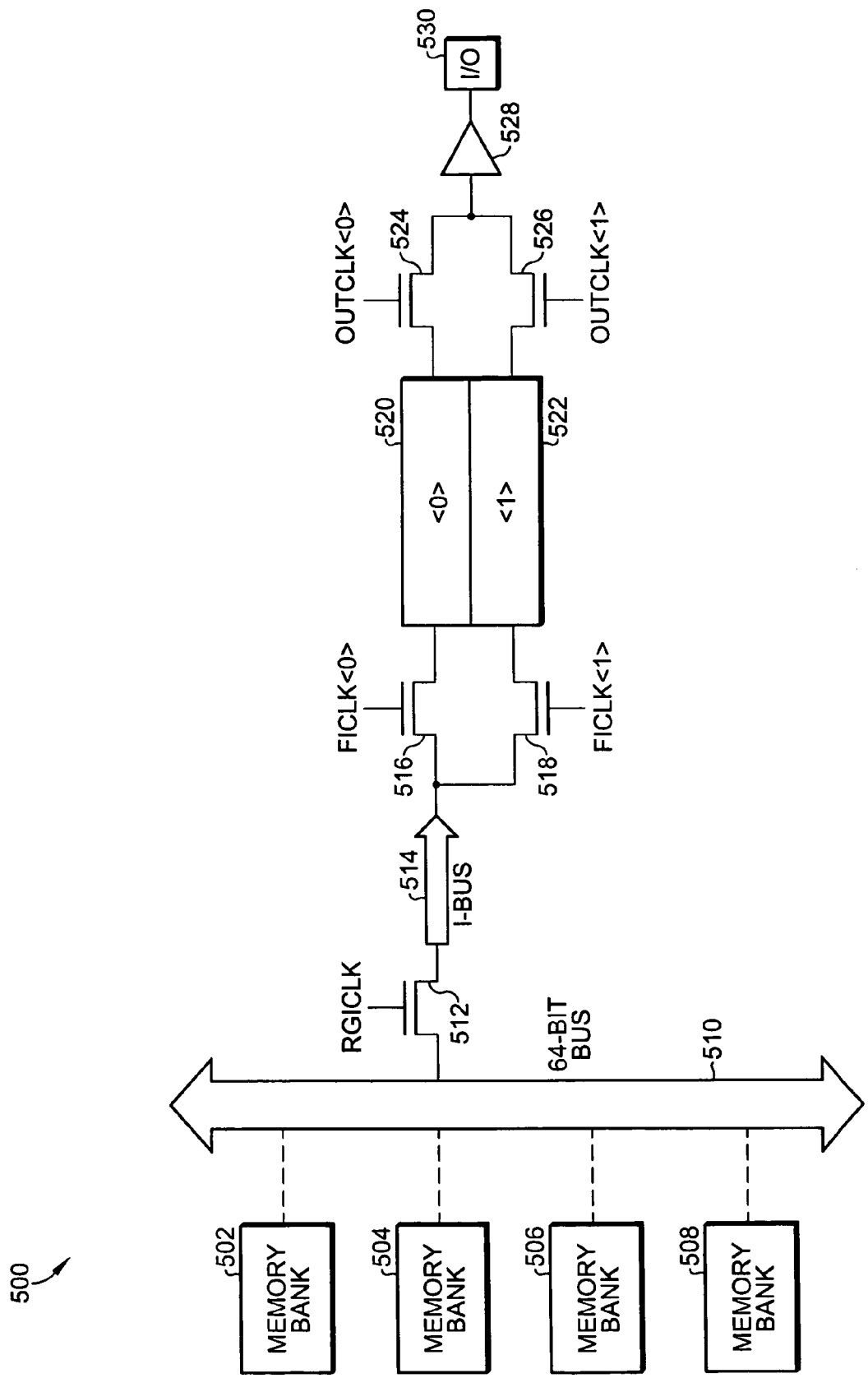
FIG. 5 is a block diagram of an integrated circuit memory including a FIFO that could use the clocking scheme of the present invention.

The basic chip architecture 500 for an integrated circuit memory capable of operating under the DDR2 standard, including FIFO circuitry and supporting the FICLK timing scheme of the present invention is shown in FIG. 5. The memory chip includes four memory banks 502, 504, 506, and 508 in communication with a 64-bit G-bus 510. The G-bus is coupled to the I-bus 514 through coupling transistor 512. The gate of transistor 512 receives the RGICLK signal, which is a logic one during a read operation. Access devices 516 and 518 couple the I-bus data to FIFO registers 520 and 522. Access device 516 receives the FICLK<0> signal and access device 518 receives the FICLK<1> signal. One FICLK signal per FIFO register is used. Output access devices 524 and 526 are used to couple the FIFO data to the output buffer 528 and to the I/O bonding pad 530. Access device 524 receives the OUTCLK<0> signal, and access device 526 receives the OUTCLK<1> signal. The output clock (OUTCLK) signals do not run with the FICLK but are based on DLL ("Delay Locked Loop") time, i.e. on a clock timed such that the output switches at the same time as the external clock switches.

Figure 6B:
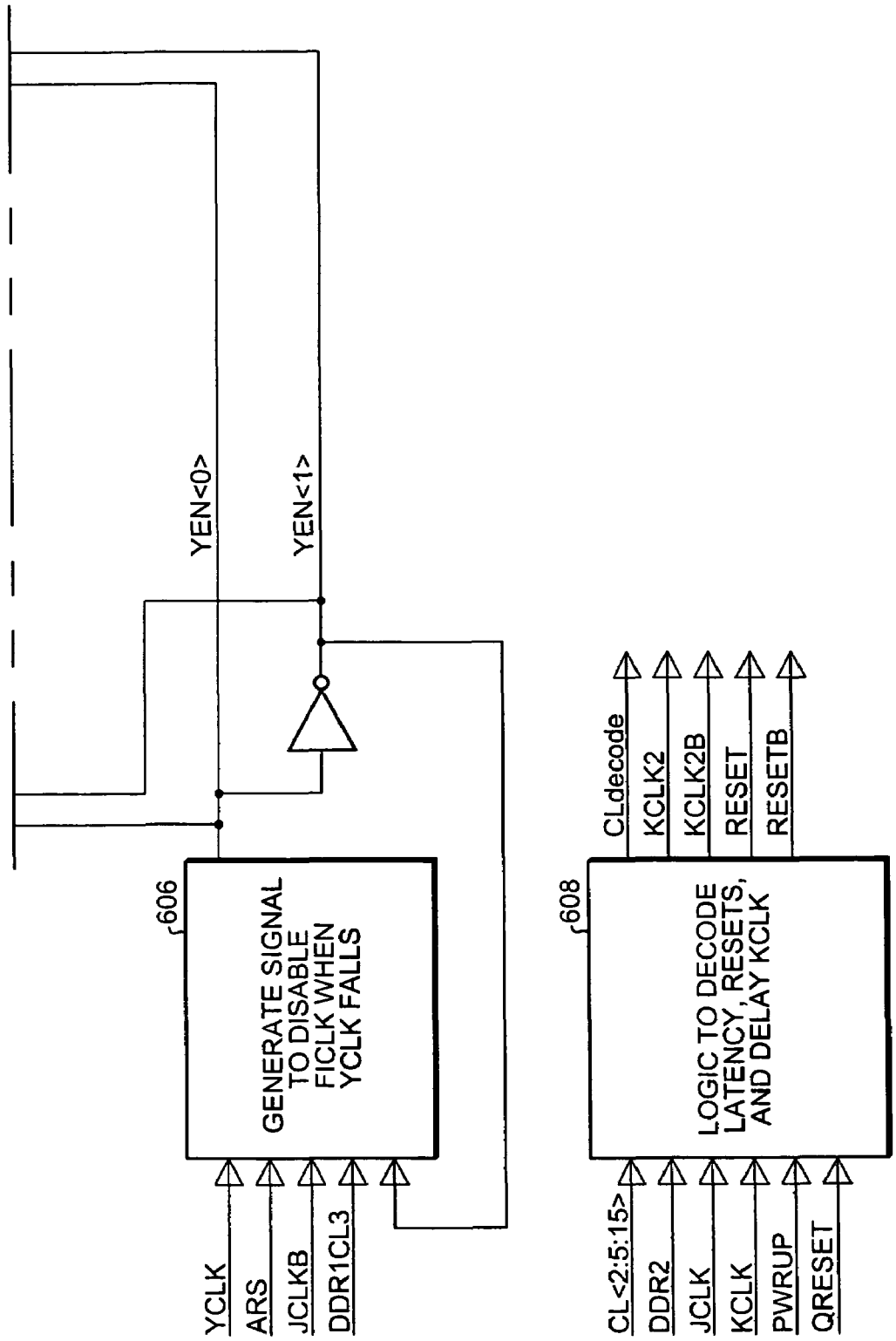
FIG. 6 is a block diagram of a circuit for providing the FIFO clocking scheme according to the present invention.

A block diagram 600 showing the general scheme used in the FICLK generation of the present invention is shown in FIG. 6. The block diagram of FIG. 6 is a combination of the FICLK and FI-shift schematics, which are described in further detail below with respect to FIGS. 7A-D and FIGS. 8A-B.

Block diagram 600 includes capture block 602, which receives the YCLK, ARS ("Any Read State", a signal held high during read commands), JCLKB and YEN<1> signals and outputs the FI_SHIFT<0>.A0 signal; capture block 604, which receives the YCLK, ARS, JCLKB and YEN<0> signals and outputs the FI_SHIFT<1>.A0 signal; FICLK enable generation block 606, which receives the YCLK, ARS, JCLKB, DDR1CL3 and YEN<1> signals and outputs the YEN<0> signal; control logic block 608 for receiving the CL<2:5, 15>, DDR2, JCLK, KCLK, PWRUP, and QRESET signals and generating the CLdecode, KCLK2, KCLK2B, RESET, and RESETB signals; delay block 610 for receiving the FI_SHIFT<0>.A0, CLdecode, KCLK2, KCLK2B, and RESET signals, and for generating the EN<0> ("ENable <0>") signal; delay block 612 for receiving the FI_SHIFT<1>.A0, CLdecode, KCLK2, KCLK2B, and RESET signals, and for generating the EN<1> ("ENable<1>") signal; FICLK start capture block 614 for receiving the EN<0> and RESETB signals and generating the FI<0> signal; and FICLK start capture block 616 for receiving the EN<1> and RESET signals and generating the FI<1> signal.

It is important to note the interconnectivity between block 614 and block 616 in FIG. 6. The FI<0> and FIB<0> signals generated by block 612 are received by block 616. Conversely, the FI<1> and FIB<1> signals generated by block 616 are received by block 614.

Block diagram 600 also includes FICLK generation block 618 for receiving the FI<0> and YEN<0> signals, as well as the DBON control signal, which indicates read/write information, and outputs the FICLK<0> clock signal. Similarly, FICLK generation block 620 receives the FI<1> and YEN<1> signals, as well as the DBON control signal, and outputs the FICLK<1> clock signal.

It should be noted that in FIG. 6 particularly, and throughout the description of the invention generally, the YCLK function can be provided by a one-shot pulse generator for better performance at higher operating frequencies.

The circuit of the present invention resets so that FICLK<0> is selected for the next read after the reset. In the implementation of the present invention, the reset actually enables FICLK<1> so that FICLK<0> is next. Either FICLK could be chosen, but it should ideally connect to the FIFO register that is "unloaded" first. That is, the FIFO register input and output pointer should ideally start at the same position.

Referring now generally to FIGS. 7A-7D and 8, a gate-level implementation of an embodiment of the present invention is shown. The embodiment shown in FIGS. 7A-7D and 8 only supports the DDR2 standard. However, with minor adjustments as is explained in detail below, the circuit implementation can be made to readily support both the DDR2 and DDR1 standards.

Figure 7A:
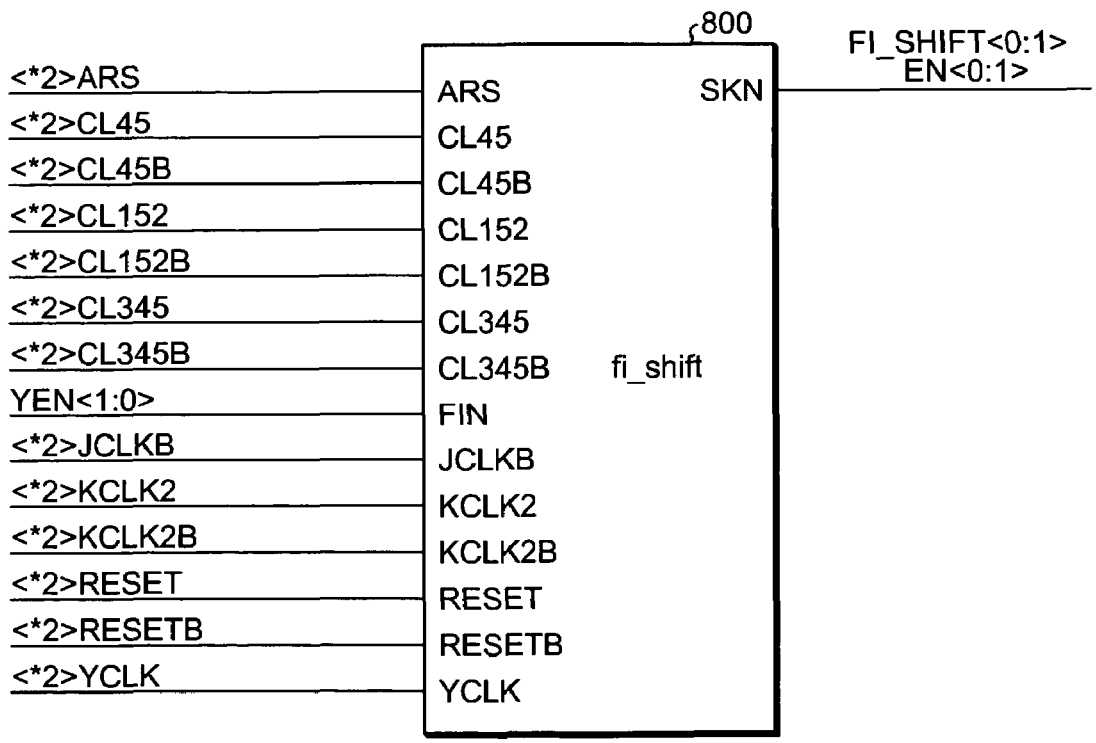
FIG. 7A is a block diagram of a portion of a circuit for providing the FIFO clocking scheme according to the present invention.

Referring specifically to FIG. 7A, a single block shows the node names and signals present in the "fi_shift" circuit 800, which is shown and described below with reference to FIG. 8. The fi_shift circuit 800 is one portion of the circuitry needed to properly generate the FICLK signals according to the present invention. The node names for the fi_shift circuit 800 are shown inside the block itself, and the signals applied to the nodes are shown outside the block.

The signal naming convention used in FIG. 7A is as follows. The "<★2>" symbol in front of many signals indicates that the signal is applied to that node in each of the two placements of the fi_shift circuits. The FI_SHIFT<0:1> label to the upper right of FIG. 7A indicates that there are two placements of the fi_shift circuit in FIG. 7, FI_SHIFT<0> and FI_SHIFT<1>. CL abbreviates CAS Latency. A "B" at the end of a signal stands for a "bar" or inversion of the indicated signal. For example, when CL23 is high CL23B is low, and when CL23 is low, CL23B is high. CL followed by a single digit (either inside angle brackets or alone) indicates a signal that is high when the part is set up in that CAS latency, and low otherwise. When CL is followed by more than one number, the signal is high if the CAS latency is any one of those numbers. ARS is the "Any Read State" signal. JCLK4B is a delayed and inverted version of the internal clock JCLK. KCLK2 is a delayed version of the external clock, and KCLK2B is the inversion of KCLK2. RESET is an internal reset signal, and RESETB is its inversion. YEN<1:0> indicates YEN<1>, from FIG. 7B, and is the signal applied to node FIN in fi_shift placement FI_SHIFT<0>. YEN<0> is applied to node FIN in fi_shift placement FI_SHIFT<1>. Node SKEN in fi_shift placement FI_SHIFT<0> is applied to signal EN<0>. Node SKN in fi_shift placement FI-SHIFT<1> is applied to signal EN<1>.

Referring now to FIG. 7B, the remaining portion of the FICLK generation circuit is shown in detail. Circuit blocks 606, 614, 616, 618, and 620 previously shown in FIG. 6 or shown in further detail in FIG. 7B. Circuit block 606 includes latches I174/I171/I172 and I175/I178/I177, as well as supporting digital circuitry such as inverters I198, I179, I181, I180, I205 and I204, NOR gate I205 and NAND gate I192, and pass gate I193. Circuit blocks 614 and 616 include inverters and a latch, and circuit blocks 618 and 620 comprise a NAND gate, a NOR gate, and two inverters.

Figure 7C:
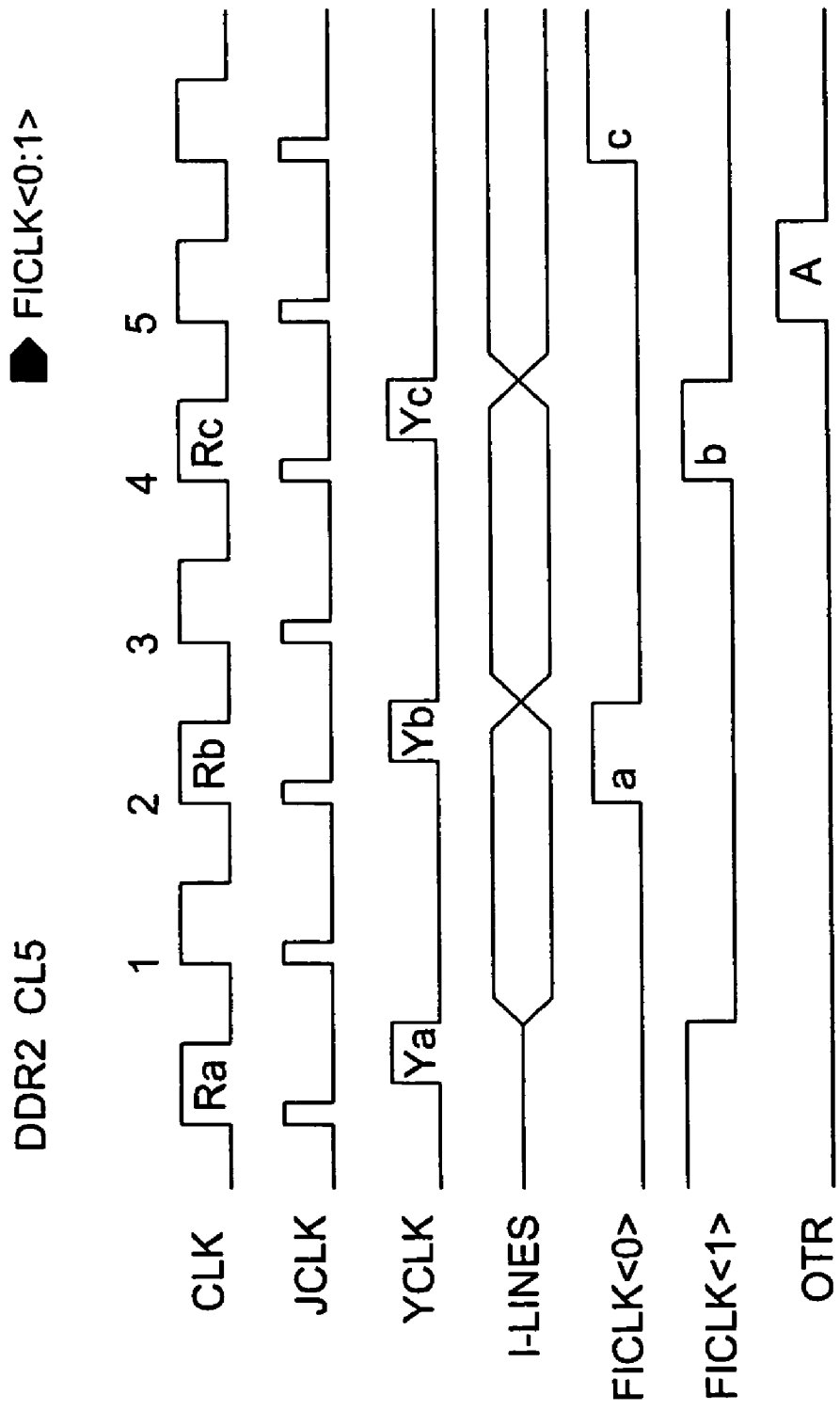
FIG. 7C is a timing diagram associated with FIGS. 7A, 7B, and 7D.

FIG. 7C shows a timing diagram for the signals of the circuit shown in FIG. 7B. FICLK turns on (with KCLK) at the following times given the following CLs as is shown in TABLE 1.

TABLE 1

| CAS LATENCY | | |
|---|---|---|
| DDR1 | DDR2 | TIME |
| CL<1.5> | | T0.5 |
| CL<2> | CL<2> | T0.5 |
| CL<2.5> | CL<3> | T1 |
| CL<3> | | T1.5 |
| | CL<4> | T2 |
| | CL<5> | T2 |

Either YCLK falling or DBON high can turn off an active FICLK.

FIG. 7C thus illustrates that FICLK (0 or 1) will only start two clocks after a read command in the DDR2 CL<5> case, and will shut off after the subsequent YCLK goes low.

Figure 7D:
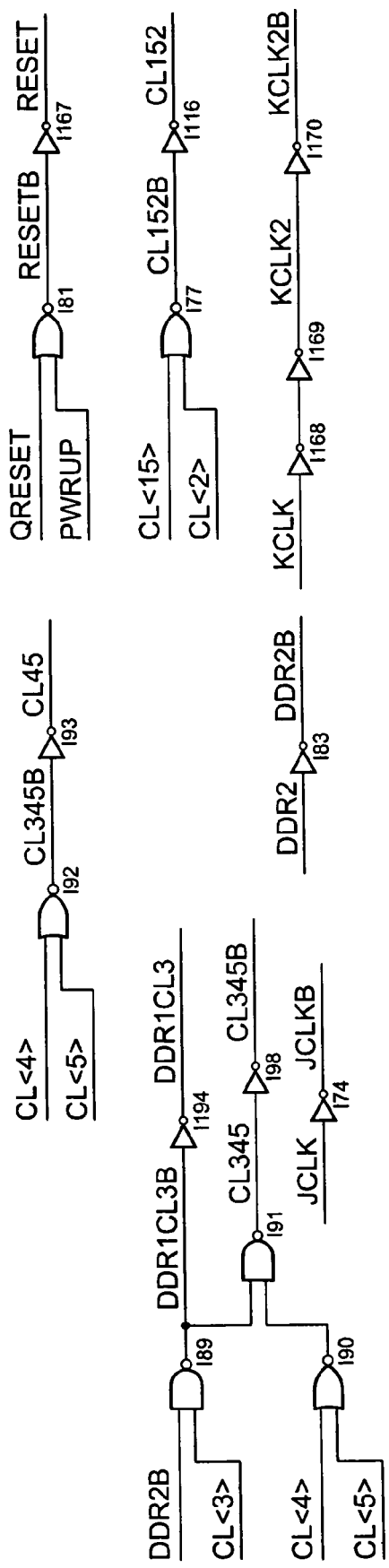
Figure 8A:
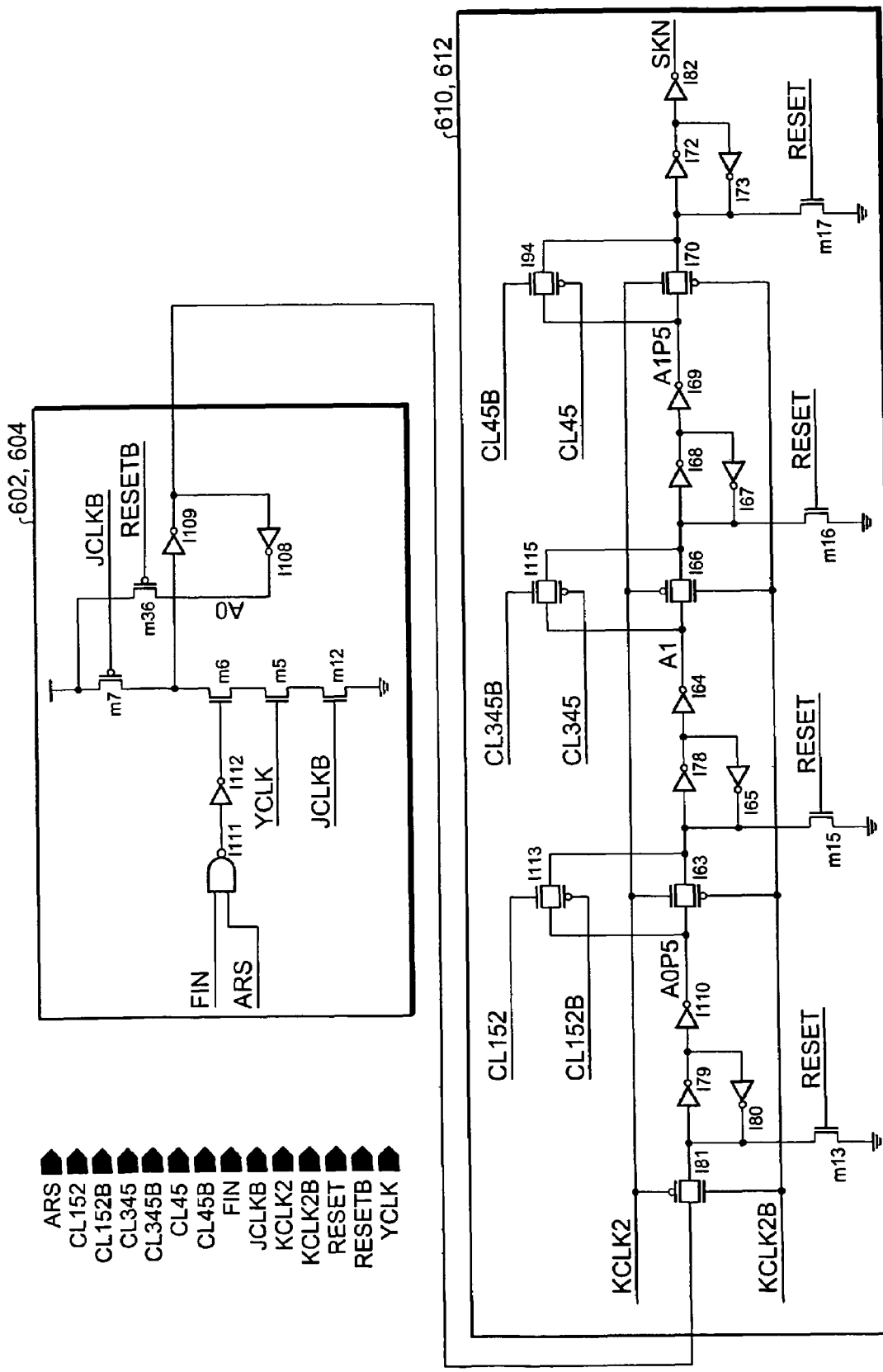
FIGS. 8A and 8B are gate-level schematics showing further details of the circuit block of FIG. 7A.
Figure 8B:
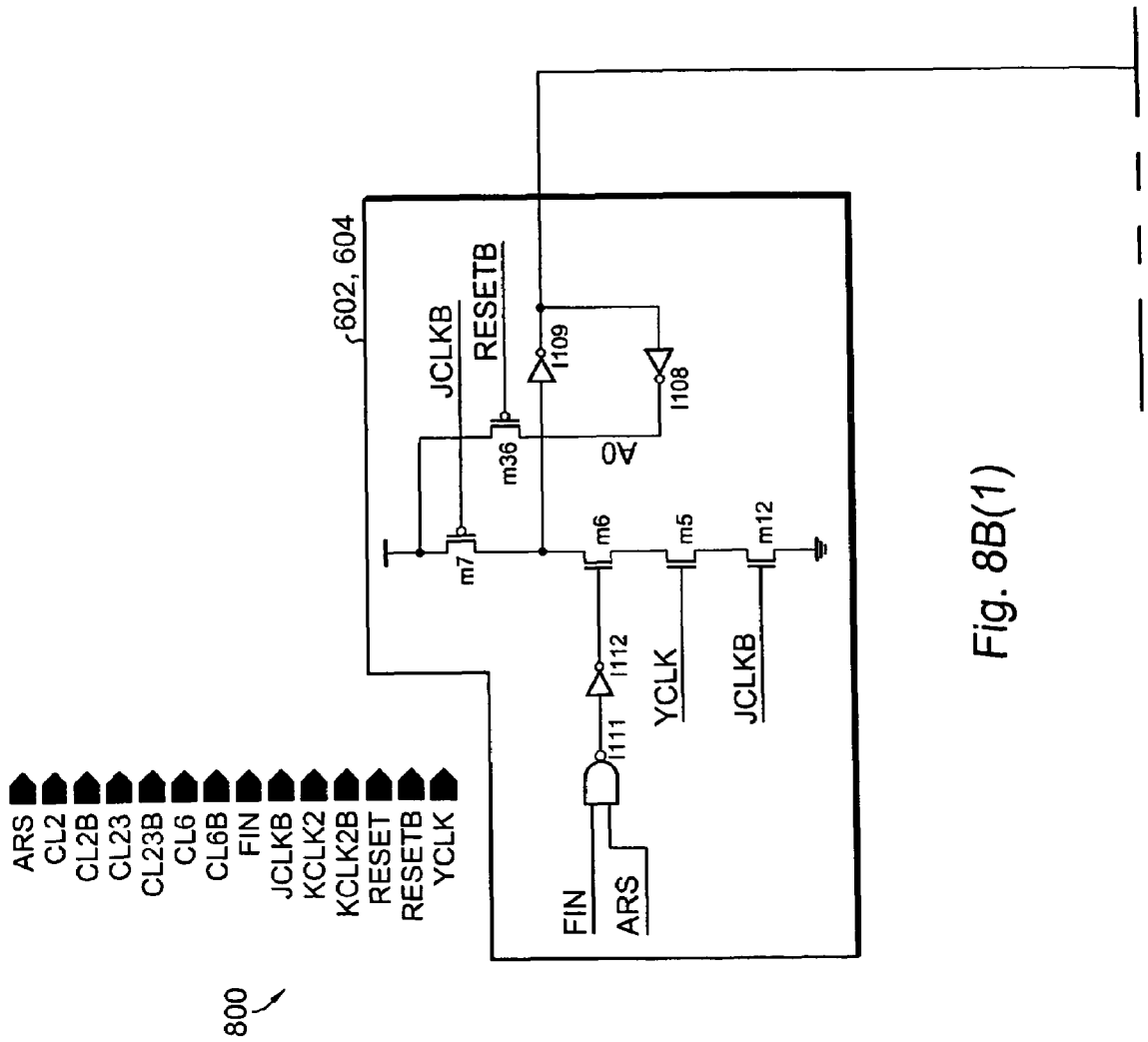

Referring now to FIG. 7D, additional digital circuitry such as NAND gates, NOR gates and inverters is shown for generating the various control and clock signals for the circuitry shown in FIGS. 7B, 8A, and 8B.

Referring now to FIG. 8A, the input NAND gate I111 receives input signal ARS and FIN (YEN<N> in FIG. 7) and is coupled to inverter 112, which is in turn coupled to N-channel transistor M6. Transistor M6 is in series with two additional N-channel transistors M5 and M12. The gate of transistor M5 receives the YCLK signal, and the gate of transistor M12 receives the JCLKB signal. When there is a high voltage on all of these control signals node A0 is pulled low, capturing the read signal. The remainder of the circuitry in FIG. 8A is a series of four latches (five latches in FIG. 8B as is described in further detail below), that are gated by KCLK2 and KCLK2B. Notice in FIG. 8A, that the latches are alternated in that the first and third latches are closed when KCLK2 is high, and the second and fourth latches are open when KCLK2 is high. The second through fourth latches can be selectively shorted, depending upon CAS latency. Each of the latches can be reset through the RESET signal received at the gates of N-channel transistors M13, M15, M16 and M17.

The circuit of FIG. 8A adjusts for the differences in clocking related to CAS Latency. In addition to the DDR2 mode of operation, the circuit of FIG. 8A also supports the DDR1 mode of operation as controlled by the circuit of FIG. 7D. The circuit of FIG. 8A includes a programmable shift register. For the DDR1 mode of operation, the chip's YCLK frequency automatically is limited to a frequency equal to TCK. The YCLK disable function automatically handles this since it only looks at YCLK falling. For DDR1, the enable path just has to adjust to the proper number of external edges to support the appropriate latency, which is controlled by the circuit of FIG. 7D.

The entire circuit of FIG. 8A is initialized when the QRESET signal of FIG. 7D goes high, which also sets A0 high, and A0P5, A1, A1P5, A2 all low in each fi_shift circuit, also setting EN<0> and EN<1> low. Referring now to FIG. 7B, this sets FI<0> low and FI<1> high, YEN<0> low and YEN<1> high, which makes FICLK<0> low and FICKLK<1> will be high if DBON is low, and low if DBON is high.

Referring back to FIG. 8A, when the ARS signal goes high, representing a read state A0 is fi_shift<0> is pulled low when the YCLK and JCLKB signals are both high. Then, when KCLK2 (a delayed version of KCLK) goes low, A0P5 in fi_shift<0> goes high. A1 in fi_shift<0> then goes high if the chip is in CL<2>, if the chip is in CL<1.5>, or when KCLK2 rises. A0 goes high when JCLKB goes low after KCLK2 rises. A1P5 in fi_shift<0> goes high if the chip is not in CL<5>, if the chip is not in CL4, if the chip is in the DDR1 mode but not CL3, or when KCLK2 falls. A0P5 falls when KCLK2 falls. EN<0> rises if the chip is not in CL4, if the chip is not in CL<5>, or when KCLK2 rises. A1 goes low if the chip is in CL<2>, if the chip is in CL<1.5>, or when KCLK2 rises. With EN<0> high and FI<1> high LFIB<0> goes low, and FI<0> goes high. With FI<0> high and EN<1> low LFIB<1> goes high, and FI<1> goes low. A1P5 in fi_shift<0> goes low if the chip is not in CL<5>, if the chip is not in CL<4>, if the is in the DDR1 mode but not CL<3>, or when KCLK2 falls. EN<0> goes low if the chip is not in CL4, if the chip is not in CL<5>, or when KCLK2 rises. ARSYCLK goes high when ARS and YCLK are both high, passing YEN<1> into NEXTYEN<0>. YORJCLKCL3 goes low when YCLK falls if the part is in the DDR2 mode, if the part is not in CL<3>, or if the part is in DDR1 mode and CL<3> and JCLK is high. YORJCLKCL3 going low passes NEXTYEN<0> into YEN<0>. The first ARSYCLK after a QREST makes NEXTYEN<0> high, and the next YORJCLKCL3 going low makes YEN<0> high and YEN<1> low. With FI<0> high and YEN<0> high FICLKB<0> goes low. With DBON low and FIANDDBONB<0> goes low and FICLK<0> goes high. The next YCLK rising with ARS high sets A0 in fi_shift<1> in the same manner that was described for fi_shift<0> above. On the YCLK falling (or the first JCLK rising after the YCLK falling in DDR1 in CL3) YEN<1> goes high and YEN<0> goes low making FICLK<0> go low. Once YEN<1> and FI<1> are both high, with DBON low, FICLK<1> is set high until the next YCLK starts the process again.

For a part complying to the DDR2-667 or DDR2-800 standards an additional latch gated by KCLK2B can be added to blocks 610 and 612. The additional latch including transmission gates I169 and I170, and a latch stage including inverters I172, I173, and I171, as well as reset transistor M35 is shown in FIG. 8B. Additional latches can be added, if desired, in order to support higher latency cases.

An example of three different timing cases for DDR2 operation with a CL of three, four, and five is shown, for a total of nine timing conditions, in FIGS. 9A-9I.

In the DDR2 CL4 or CL5 cases, the FICLK is not enabled until at least two clocks prior to the output clock edge. Thus, for output at the T4 edge (T0+four clocks=CL4), FICLK is not enabled any sooner than T2.

Different CL values will be delayed by different amounts depending upon what is necessary to meet the CL requirement, but not let the data run-through, i.e. can't load FICLK<0> the second time until the data from the first FICLK<0> has been read by the output buffer—"OUT-A" in the above example.

Figure 9A:
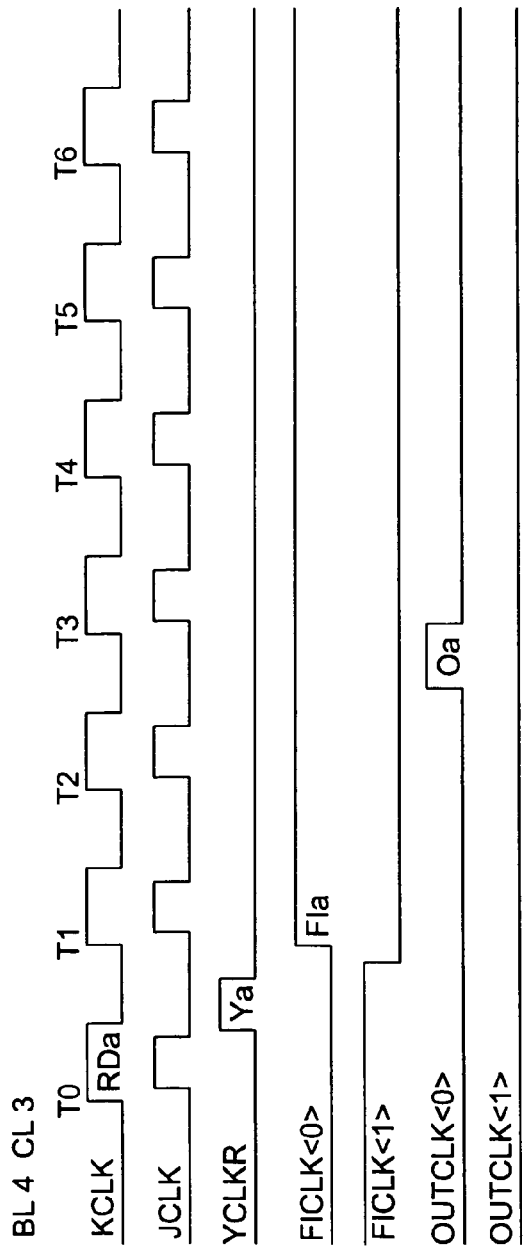
FIGS. 9A-9C are timing diagrams illustrating normal, slow and fast operating modes for the clocking scheme of the present invention.

FIG. 9A shows a single read burst length 4, a CAS Latency of 3, and FICLK<1> shutting off and FICLK<0> turning on.

Figure 9B:
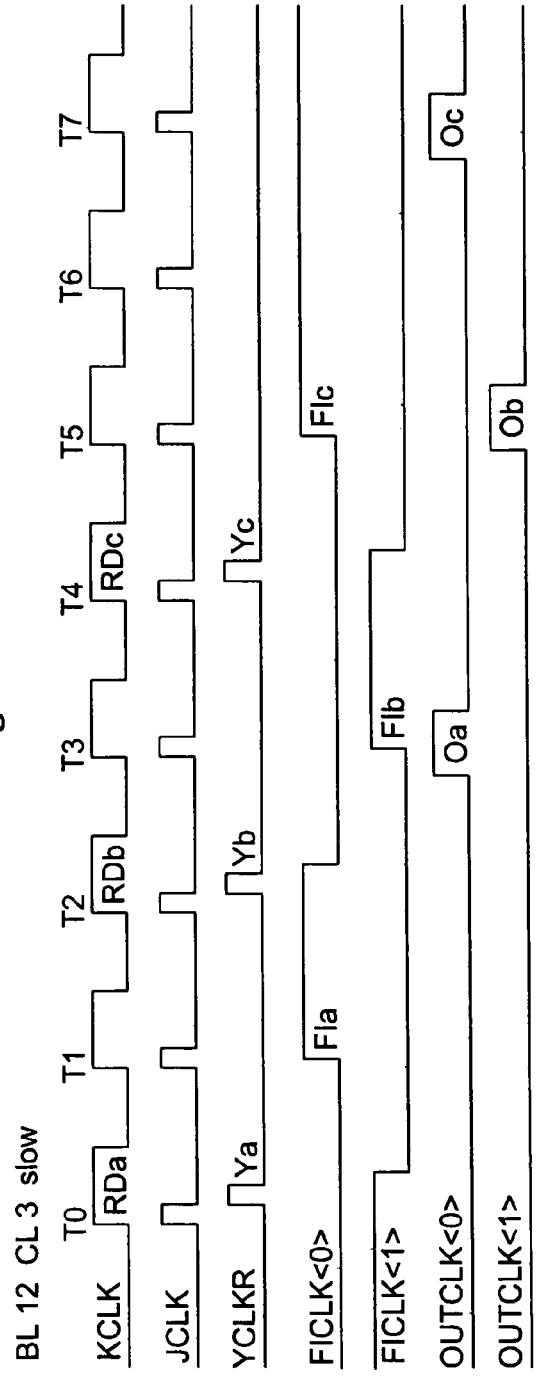

FIG. 9B shows three reads in a row each burst length 4 (total of 12), a CAS Latency of 3, and operation at a relatively slow clock frequency. Note that the FICLK pulses are a small fraction of the clock period to prevent data run-through.

Figure 9C:
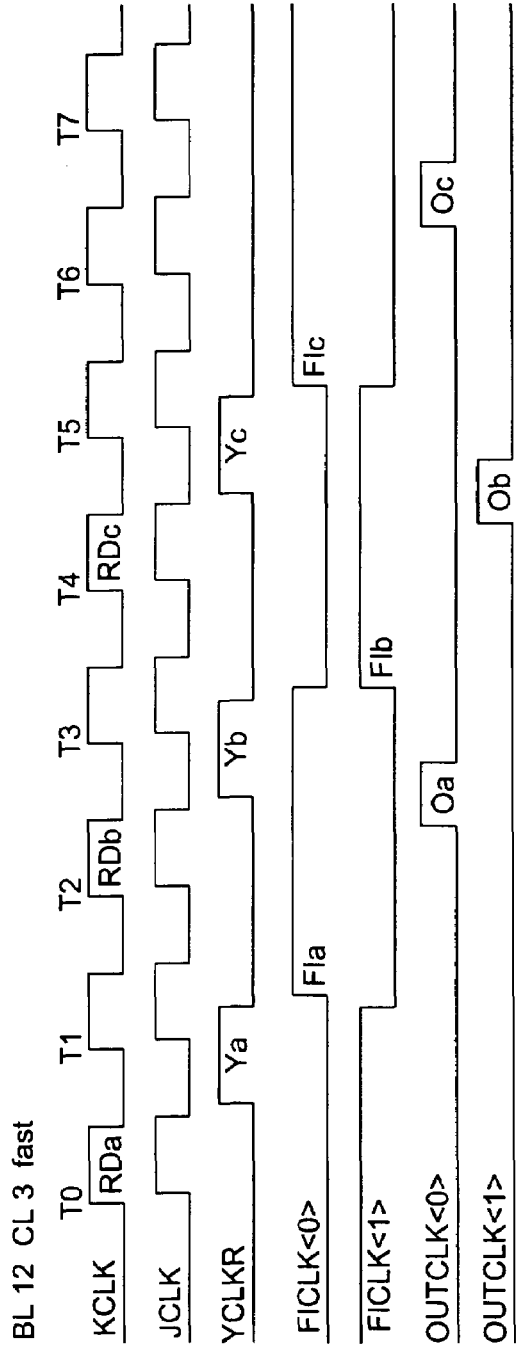

FIG. 9C shows three reads in a row each burst length 4 (total of 12), a CAS Latency of 3, and operation at a relatively fast clock frequency. Note that the FICLK pulses are a large fraction of the clock period to allow a maximum window for data that will be delayed by a large fraction of the clock period.

Figure 9D:
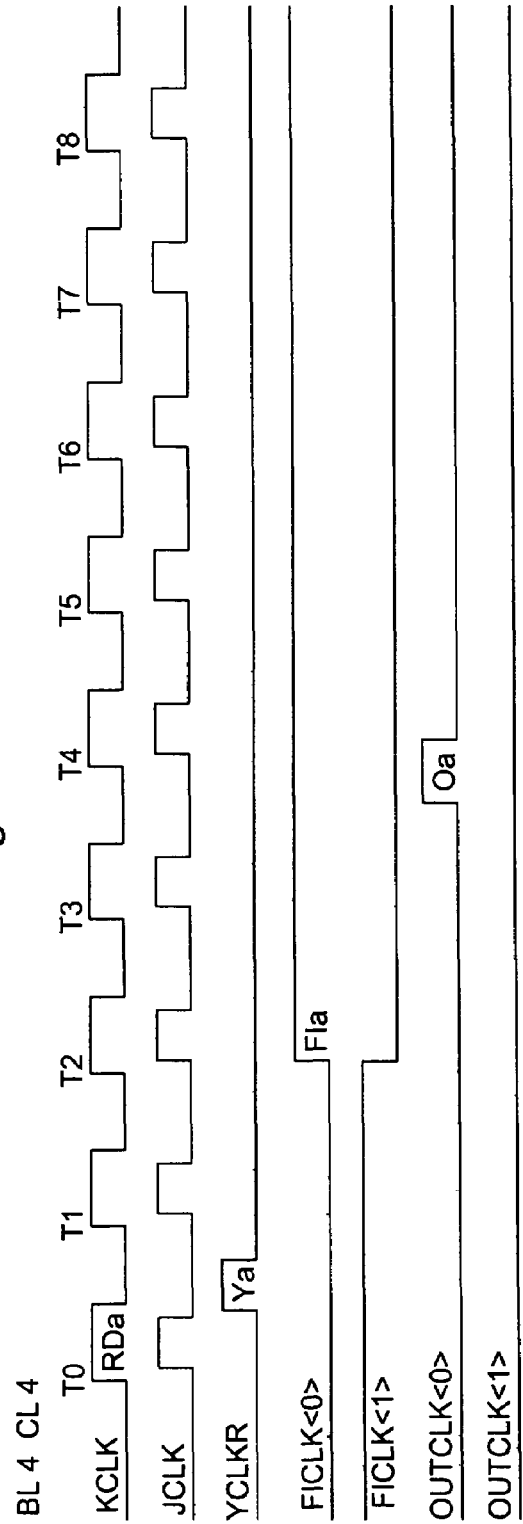
Figure 9E:
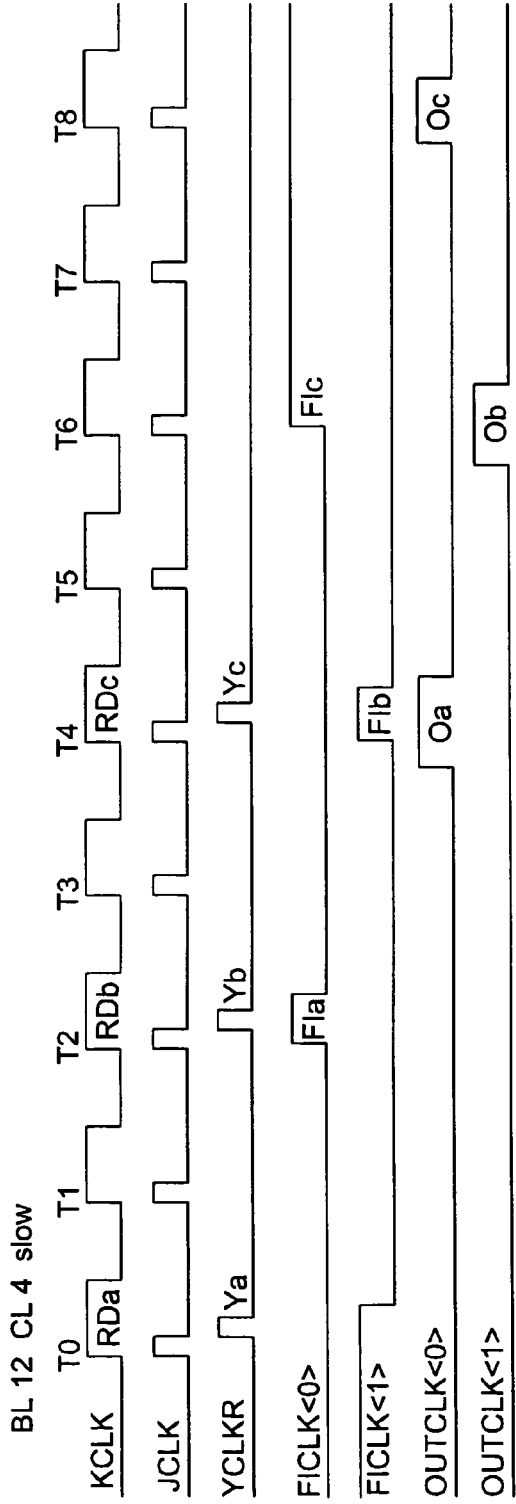
Figure 9F:
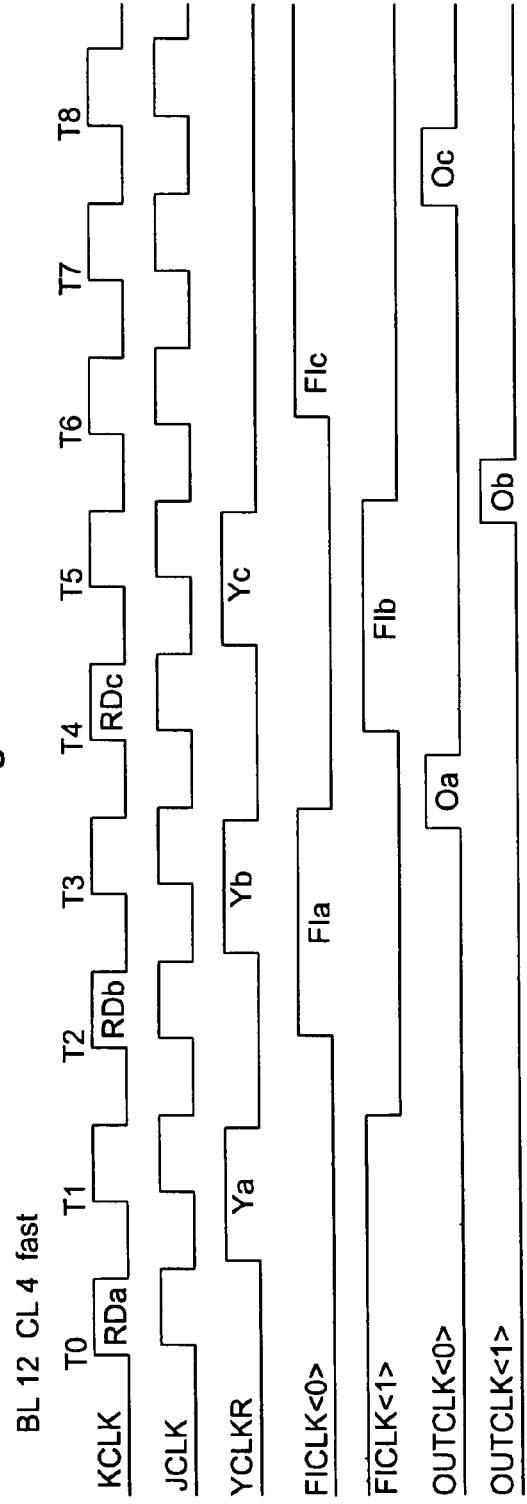

The timing diagrams of FIGS. 9D-9F are similar in nature to the timing diagrams of FIGS. 9A-9C, but show the timing relationships of the signals for a CAS Latency of 4.

Figure 9G:
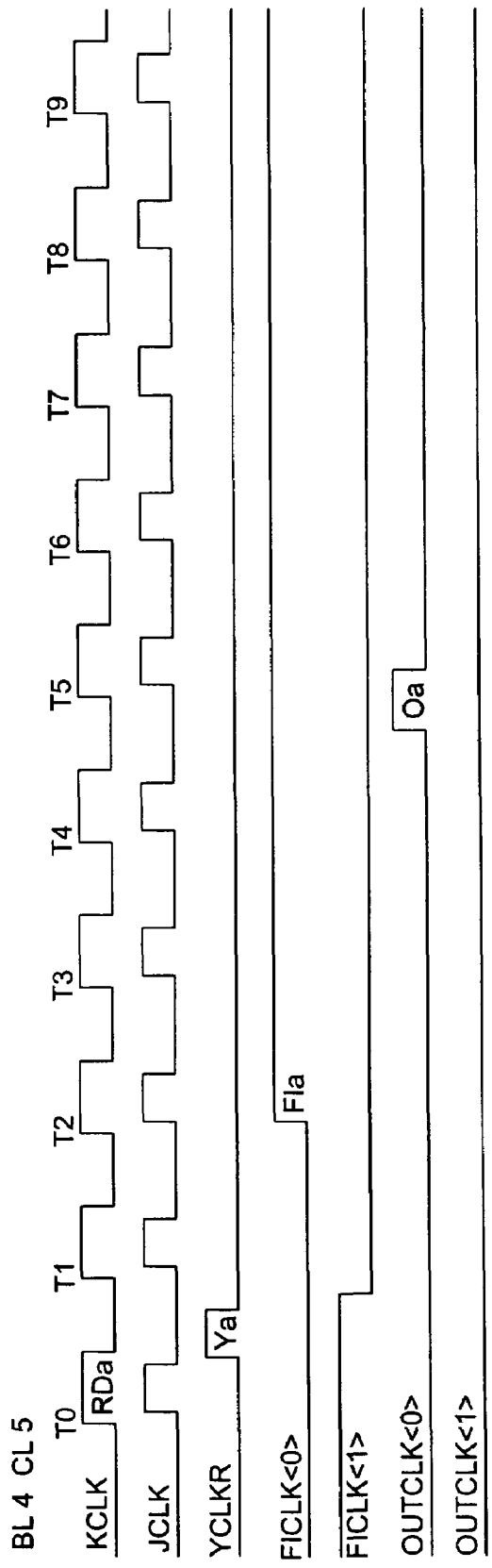
Figure 9H:
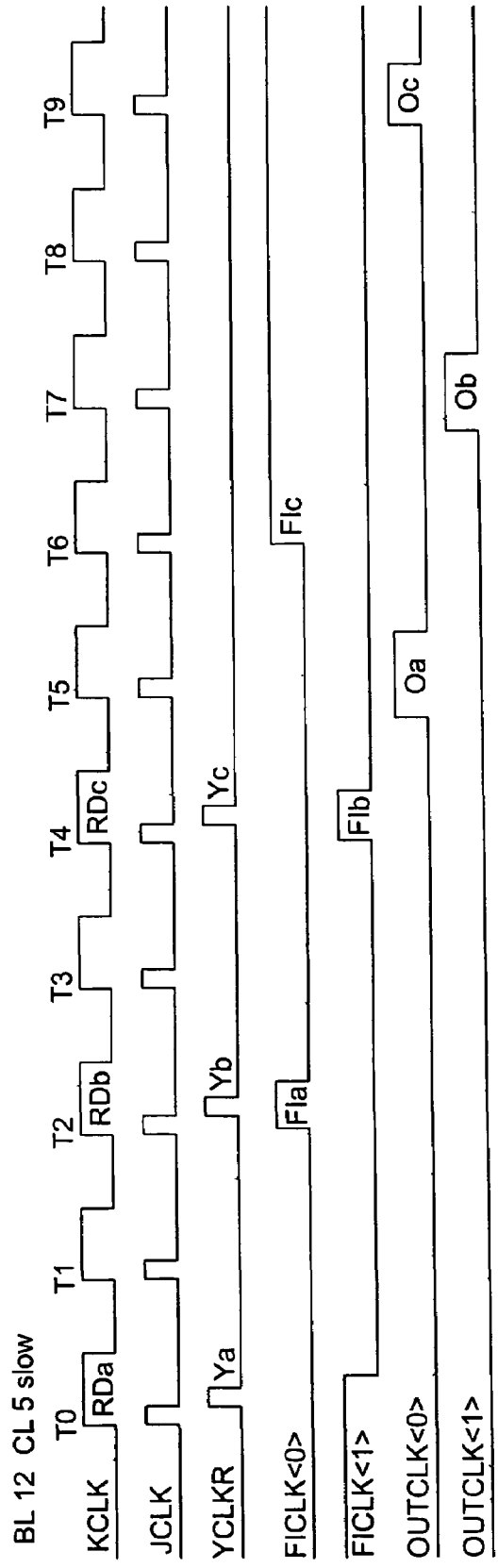
Figure 9L:
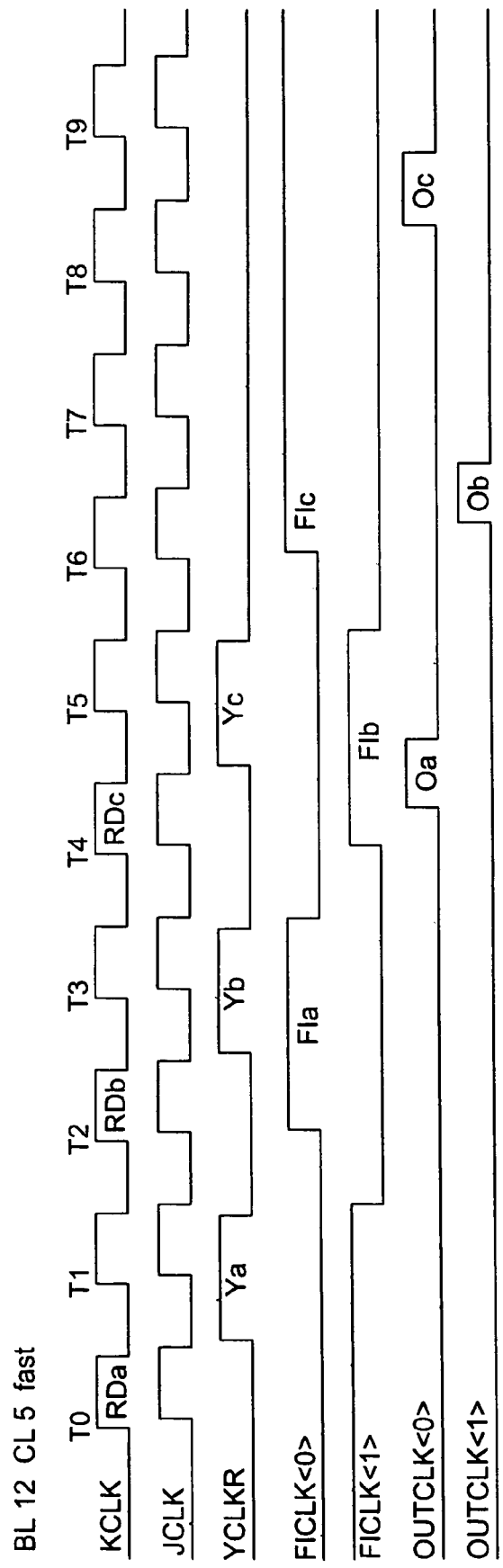

The timing diagrams of FIGS. 9G-9I are similar in nature to the timing diagrams of FIGS. 9A-9C, but show the timing relationships of the signals for a CAS Latency of 5.

Figure 10:
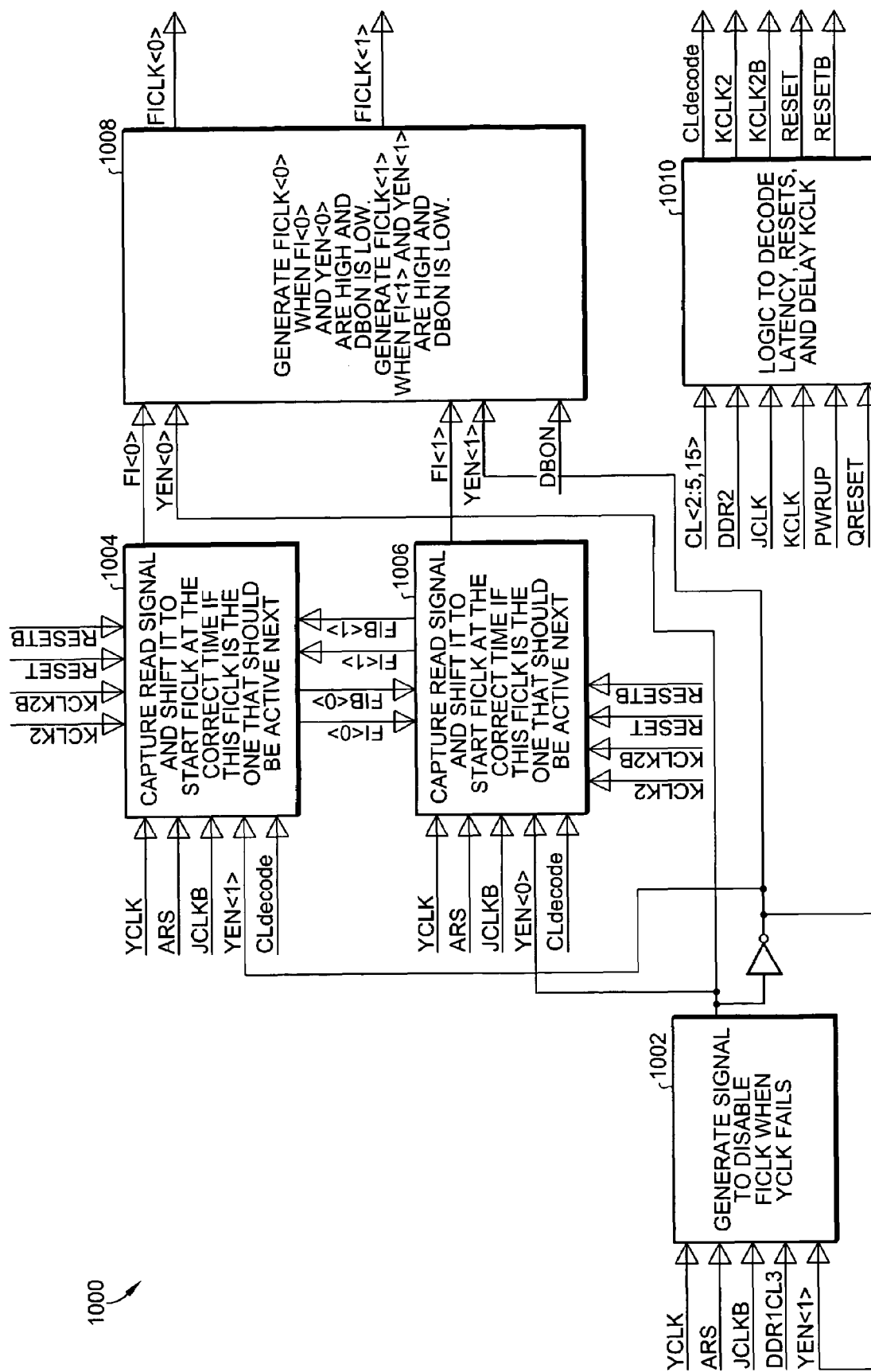
FIG. 10 is a simplified block diagram of an embodiment of the present invention.

FIG. 10 shows a simplified block diagram of the circuit according to an embodiment of the present invention. Circuit 1000 includes block 1002 for receiving the YCLK, ARS, JCLKB, DDR1CL3, and YEN<1> signals, and for providing the YEN<0> and YEN<1> signals. Block 1002 generates the signals to disable FICLK when YCLK falls. Blocks 1004 and 1006 each capture the read signal and shift it to start the FICLK signal at the correct time, if the FICLK signal is the one that should be activated next. Block 1004 receives the YCLK, ARS, JCLKB, YEN<1>, CLdecode, KLCK2, KCLK2B, RESET, RESETB, FI<1>, and FIB<1> signals, and provides the FI<0> and FIB<0> signals. Block 1006 receives the YCLK, ARS, JCLKB, YEN<0>, CLdecode, KCLK2, KCLK2B, RESET, RESETB, FI<0>, and FIB<0> signals, and provides the FI<1> and FIB<1> signals. Block 1008 generates the FICLK<0> signal when FI<0> and YEN<0> are high and DBON is low, and generates the FICLK<1> signal when FI<1> and YEN<1> are high and DBON is low. Block 1010 is a logic block to decode latency, resets, and delays the KCLK signal. Block 1010 receives the CL<2:5, 15>, DDR2, JCLK, KCLK, PWRUP, and QRESET signals, and generates the CLdecode, KCLK2, KCLK2B, RESET, and RESETB signals. Circuit 1000 shown in FIG. 10 is an alternative, simplified, circuit, which is shown in block diagram form to further aid in the understanding of the present invention.

GLOSSARY

YCLKR is a YCLK signal that only fires as a result of a read.

JCLK—internal clock, frequency the same as the external clock, but clock high time may or may not be a "fixed width", i.e. duty cycle of internal clock can be different than the external clock.

YCLK—internal clock that corresponds to column access time for the DRAM. In our DDR2 scheme, YCLK can be equal to the external clock Tck. (or one-half frequency) Data is output from the array to the chip's main data bus (I-bus) on the falling edge of the YCLK. For our DDR2 parts, YCLK only fires on cycles when it is needed, its frequency is limited to one-half of the main clock frequency. For DDR1 parts, YCLK frequency=chip clock frequency.

KCL—an internal version of the external clock, simply buffered.

FICLK—FIFO Input clock. Loads the output FIFO register. Runs off an external-based clock (not DLL clock domain). The output clock from the FIFO runs of the DLL clock domain.

FIFO—"First In First Out", basic register used to store data in the output path. Each output bit has several FIFO registers in parallel, the exact number of parallel registers is a function of the CAS latency supported and the clock frequency range over which the part must work.

Each FIFO register is loaded as a function of its assigned FICLK<#>, which is enabled and disabled based on signals in the main chip clock domain. Data is read out of each particular FIFO register based on some output clock running in the DLL clock domain. In this way the FIFO serves as a buffer between the two clock domains.

CL—CAS Latency, after read command, how many cycles before the data is actually output from the DRAM.

While there have been described above the principles of the present invention in conjunction with specific components, circuitry and bias techniques, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

We claim:

1. A method of operating FIFO registers in an integrated circuit memory comprising:
   disabling a first FIFO loading clock signal to enter data into a first register based on data associated with an internal chip clock signal; and
   enabling a second FIFO loading clock signal to enter data into a second register when the first FIFO loading clock signal has been disabled and the proper number of clock edges has expired to satisfy a specified read latency,
   wherein the method of enabling and disabling the FIFO loading clock signals are performed during a first operational mode.

2. The method of claim 1 further comprising slaving either or both of the first and second FIFO loading clock signals to a predetermined phase of a main chip clock during a second operational mode.

3. The method of claim 2 wherein the first operational mode is compatible with a DDR2 standard and the second operational mode is compatible with a DDR1 standard.

4. A circuit for generating FIFO loading clocks in an integrated circuit memory comprising:
   circuitry for disabling a first FIFO loading clock signal to enter data into a first register based on data associated with a second FIFO loading clock signal; and
   circuitry for enabling the second FIFO loading clock signal to enter data into a second register when the first FIFO loading clock signal has been disabled and the proper number of clock edges has expired to satisfy a specified read latency,
   wherein the disabling circuitry and the enabling circuitry are operational during a first operational mode.

5. The circuit of claim 4 further comprising circuitry for slaving either or both of the first and second FIFO loading clock signals to a predetermined phase of a main chip clock during a second operational mode.

6. The method of claim 5 wherein the first operational mode is compatible with a DDR2 standard and the second operational mode is compatible with a DDR1 standard.

7. The circuit of claim 4 comprising a plurality of serially-coupled latches.

8. The circuit of claim 7 wherein the plurality of latches receives a clock signal.

9. The circuit of claim 7 wherein the plurality of latches receives a clock signal and an inverted clock signal.

10. The circuit of claim 7 wherein the plurality of latches are alternatively opened or closed.

11. The circuit of claim 7 wherein the plurality of latches each includes an input transmission gate.

12. The circuit of claim 7 wherein the plurality of latches each includes a pair of cross-coupled inverters.

13. The circuit of claim 7 wherein the plurality of latches each includes a reset transistor.

14. The circuit of claim 7 wherein the plurality of latches each includes an output inverter.

15. The circuit of claim 7 wherein the plurality of latches includes at least one latch for receiving CAS latency information.

16. The circuit of claim 7 wherein the plurality of latches is equal to four.

17. The circuit of claim 7 wherein the plurality of latches is equal to five.

18. The circuit of claim 7 further comprising an input logic gate for capturing a read signal.

19. The circuit of claim 7 further comprising receiving a mode selection signal.

* * * * *